(12) United States Patent
Krämer et al.

(10) Patent No.: US 11,433,739 B2
(45) Date of Patent: Sep. 6, 2022

(54) AIR VENT FOR A MOTOR VEHICLE

(71) Applicant: ILLINOIS TOOL WORKS INC., Glenview, IL (US)

(72) Inventors: Günther Krämer, Enkenbach-Alsenborn (DE); Laurent Le Tohic, Enkenbach-Alsenborn (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 254 days.

(21) Appl. No.: 16/098,468

(22) PCT Filed: May 3, 2017

(86) PCT No.: PCT/IB2017/000502
§ 371 (c)(1),
(2) Date: Nov. 2, 2018

(87) PCT Pub. No.: WO2017/191502
PCT Pub. Date: Nov. 9, 2017

(65) Prior Publication Data
US 2019/0092139 A1    Mar. 28, 2019

(30) Foreign Application Priority Data

May 4, 2016    (DE) ..................... 10 2016 108 356.9

(51) Int. Cl.
*B60H 1/34*    (2006.01)
*F24F 13/075*  (2006.01)

(52) U.S. Cl.
CPC ... *B60H 1/3421* (2013.01); *B60H 2001/3464* (2013.01); *B60H 2001/3492* (2013.01); *F24F 13/075* (2013.01)

(58) Field of Classification Search
CPC .................................................. B60H 1/00871
USPC ................................ 454/108, 109, 152, 155
See application file for complete search history.

(56) References Cited

U.S. PATENT DOCUMENTS

| | | | |
|---|---|---|---|
| 3,045,576 A | * | 7/1962 | Goettl ................... F24F 13/075 454/314 |
| 4,892,288 A | * | 1/1990 | Norbury, Jr. ......... B60H 1/3435 251/306 |
| 5,080,002 A | * | 1/1992 | Soethout ............ B60H 1/00871 454/154 |

(Continued)

FOREIGN PATENT DOCUMENTS

| | | |
|---|---|---|
| CN | 102862462 A | 1/2013 |
| CN | 104203530 A | 12/2014 |

(Continued)

OTHER PUBLICATIONS

PCT, International Search Report and Written Opinion, International Application No. PCT/IB2017/000502; dated Aug. 3, 2017, 8 pages.

*Primary Examiner* — Edelmira Bosques
*Assistant Examiner* — Frances F. Hamilton
(74) *Attorney, Agent, or Firm* — Thompson Hine LLP

(57) ABSTRACT

An air vent for a motor vehicle includes a housing which defines an air guiding channel and a plurality of lamellae which are provided at their ends with bearing pins, the lamellae being pivotably attached thereby to the housing. The lamellae are mounted on opposing sides with one respective radial bearing and on just one side with one respective axial bearing.

19 Claims, 6 Drawing Sheets

(56) References Cited

U.S. PATENT DOCUMENTS

| | | | | |
|---|---|---|---|---|
| 5,482,506 A * | 1/1996 | Tsuda | ............. | B29C 45/0017 |
| | | | | 454/155 |
| 5,947,813 A * | 9/1999 | Chow | ............. | B60H 1/3435 |
| | | | | 454/316 |
| 6,447,388 B1 * | 9/2002 | de Barros | ............. | B60H 1/3428 |
| | | | | 454/202 |
| 7,354,340 B2 * | 4/2008 | Mochizuki | ............. | B60H 1/3421 |
| | | | | 454/152 |
| 9,162,551 B2 * | 10/2015 | Yamamoto | ............. | B60H 1/3428 |
| 10,792,976 B2 * | 10/2020 | Wada | ............. | B60H 1/00664 |
| 11,235,643 B2 * | 2/2022 | Baker | ............. | B60H 1/3428 |
| 2003/0157880 A1 * | 8/2003 | Nishida | ............. | B60H 1/3414 |
| | | | | 454/155 |
| 2005/0227607 A1 * | 10/2005 | Stevenson | ............. | B60H 1/249 |
| | | | | 454/164 |
| 2006/0063480 A1 * | 3/2006 | Neumann | ............. | B60H 1/3421 |
| | | | | 454/152 |
| 2006/0073781 A1 * | 4/2006 | Mochizuki | ............. | F24F 13/15 |
| | | | | 454/152 |
| 2009/0149124 A1 * | 6/2009 | Stevenson | ............. | B60H 1/00671 |
| | | | | 454/358 |
| 2010/0112931 A1 * | 5/2010 | Leonhard | ............. | F24F 13/15 |
| | | | | 454/336 |
| 2010/0263401 A1 * | 10/2010 | Sakakibara | ............. | B60H 1/3421 |
| | | | | 62/408 |
| 2013/0012114 A1 | 1/2013 | Kong | | |
| 2013/0149952 A1 * | 6/2013 | Demerath | ............. | B60H 1/3421 |
| | | | | 454/155 |
| 2014/0045418 A1 * | 2/2014 | Schneider | ............. | B60H 1/00678 |
| | | | | 454/155 |
| 2014/0215981 A1 * | 8/2014 | Pfannenberg | ............. | F04D 29/703 |
| | | | | 55/501 |
| 2015/0044960 A1 * | 2/2015 | Hara | ............. | B29C 45/14811 |
| | | | | 454/254 |
| 2015/0336445 A1 * | 11/2015 | Uehara | ............. | B60H 1/3442 |
| | | | | 454/155 |
| 2016/0200167 A1 * | 7/2016 | Wada | ............. | B60H 1/3414 |
| | | | | 454/152 |
| 2017/0259649 A1 * | 9/2017 | Shibata | ............. | B60H 1/3421 |
| 2019/0193526 A1 * | 6/2019 | Stark | ............. | B60H 1/3421 |

FOREIGN PATENT DOCUMENTS

| | | | | |
|---|---|---|---|---|
| CN | 105142943 A | 12/2015 | | |
| DE | 29819759 U1 | 4/1999 | | |
| DE | 20019038 U1 | 5/2001 | | |
| DE | 202011052143 U1 | 1/2012 | | |
| DE | 102013107095 A1 | 1/2014 | | |
| DE | 102014102332 A1 | 6/2015 | | |
| DE | 102016112925 A1 * | 12/2015 | ............. | B60H 1/34 |
| DE | 102015120600 A1 | 1/2016 | | |
| EP | 0253609 A2 * | 1/1988 | ............. | B60H 1/3435 |
| FR | 3043361 A1 * | 5/2017 | ............. | B60H 1/3414 |
| JP | S5955344 | 4/1984 | | |
| JP | S 5955344 U | 4/1984 | | |
| JP | H0899527 A | 4/1996 | | |
| JP | H0899527 A1 | 4/1996 | | |
| JP | 2010132204 A | 6/2010 | | |
| JP | 2016 203695 | 12/2016 | | |
| JP | 2016203695 A * | 12/2016 | | |

\* cited by examiner

AIR VENT FOR A MOTOR VEHICLE

The invention relates to an air vent for a motor vehicle, comprising a housing which defines an air guiding channel and a plurality of lamellae which are provided at their ends with bearing pins, the lamellae being pivotably attached thereby to the housing.

Air which originates from an air conditioning unit of the motor vehicle flows through the air vent into the interior of the vehicle. The air conditioning unit serves to heat the air and, in the case of a climate control system, also to cool the air. Moreover, the air throughflow may be adjusted by means of a fan. The air vent itself generally serves to adjust the direction in which the air flows into the vehicle interior. To this end, the lamellae are pivotable in order to conduct the airflow, for example upwardly or downwardly.

A fundamental problem with such an air vent is the mounting of the lamellae. Firstly, it is intended to be possible to pivot the lamellae easily. Secondly, it is intended that the lamellae are prevented from being adjusted automatically in an undesirable manner. These requirements, which are already contradictory, are also intended to be fulfilled over a very wide range of temperature and humidity and also over a very long service life. Finally, rattling noises are intended to be prevented.

Different attachments by which lamellae are able to be mounted are known from the prior art. For example, the bearing pins of the lamellae may be mounted in spring clips which have an Ω-shape. Due to the resilience of the spring clips, the lamellae are prevented from being adjusted automatically in an undesirable manner and from rattling. However, potential unroundness of the bearing pins leads to the actuating force of the lamellae fluctuating significantly over the pivoting range.

The object of the invention is to develop an air vent of the type mentioned in the introduction, such that the requirements for mounting the lamellae may be fulfilled in an improved manner.

To achieve this object, according to the invention in an air vent of the type mentioned in the introduction it is provided that the lamellae are mounted on opposing sides with one respective radial bearing and on just one side with one respective axial bearing. The invention is based on the fundamental idea of receiving the lamellae in the "conventional" manner by means of a three-point bearing in the housing, so that complicated spring elements, or the like, are not required. By means of a three-point bearing, the tolerances which are generally present may be compensated in the best possible manner, so that they have no effect on the forces required for pivoting the lamellae.

Preferably, the axial bearing is designed separately from the radial bearing of the corresponding side. This produces the space for optimally adapting each bearing independently of the other to the respective requirements.

Preferably, the axial bearing comprises a fork which encompasses the bearing pin assigned thereto with radial clearance, wherein the bearing pin is provided with at least one axial bearing surface which is arranged on one side of the fork. By means of this design, it is ensured that the mounting on the side of the axial bearing is not overspecified.

The axial bearing surfaces may also be provided on both sides of the fork.

Preferably, the fork comprises an insertion chamfer. This simplifies the insertion of the bearing pin in the fork when mounting the lamellae in the housing.

According to one embodiment of the invention, the axial bearings are combined to form an axial bearing strip. This leads to a compact design of the housing and to the support of the axial bearings relative to one another, resulting in greater strength.

The axial bearings are preferably integrally formed with the housing so that the cost for separate mounting is avoided.

According to the preferred embodiment of the invention, the radial bearings are designed as a circular opening which is preferably closed in the circumferential direction, the corresponding bearing pin engaging therein. This has the advantage that, even if the bearing pin were to be slightly unround, the actuating forces for the lamellae remain approximately uniform over the pivoting range; this represents a clear advantage relative to a-shaped spring clips in which the actuating forces of the lamellae depend very significantly on how the unround cross section of the bearing pin is oriented relative to the slot of the spring clips.

The radial bearings are preferably attached to the housing so as to be able to be resiliently deflected in the axial direction. By means of this design it is possible to mount the lamellae retrospectively in the radial bearings which are already present on the housing.

According to one embodiment of the invention, the radial bearings of one side are combined together to form a radial bearing strip. In the same manner as in the axial bearings, therefore, a more stable design results overall.

Preferably, the radial bearings are integrally formed with the housing. The housing may be an injection-molded component made of plastics, for example, in which it is not necessary to mount any bearings retrospectively.

According to one embodiment, the radial bearings are designed to protrude to the side. This results in the desired offset relative to the axial bearings. Moreover, a radial bearing which is arranged to project may be easily deflected in a resilient manner when the lamellae are mounted in the housing.

According to one embodiment of the invention, slots are provided between the housing and the radial bearing. The slots ensure that the radial bearings may be axially deflected in the desired manner when the lamellae are mounted in the housing.

In order to facilitate the clipping of the bearing pins in the housing, clipping chamfers may be assigned in each case to the radial bearings.

According to one embodiment of the invention, each lamella is provided with a positioning surface. This serves to orientate the lamella in a suitable manner in a mounting device.

Preferably, the lamellae are connected together by means of a coupling rod which braces the lamellae relative to one another in the axial direction. The coupling rod in this case has a dual function: firstly it ensures that all of the lamellae are pivoted synchronously with one another. Secondly, it ensures that the lamellae have no clearance in the axial direction; as a result rattling noise is avoided.

The coupling rod may extend, in particular, in a C-shaped manner, i.e. be curved in only one direction. By means of this design, the axial bracing of the lamellae relative to one another may be adjusted very reliably. It is also possible to brace the coupling rod in a serpentine manner, i.e. with a path which has a plurality of turns.

Preferably it is provided that the coupling rod for at least two lamellae is provided with an Ω-shaped opening, a coupling pin engaging therein. This facilitates the mounting since the coupling rod may be pushed onto the coupling pin in the radial direction.

Particularly preferably, the coupling pin comprises a portion with a smaller diameter, a portion with a larger diameter and a conical portion located therebetween. The portion with the smaller diameter permits the Ω-shaped opening to be pushed onto the coupling pin. Subsequently, the coupling rod may be displaced in the axial direction so that it reaches the portion with the larger diameter. As a result, the coupling rod is received without rattling on the coupling pin.

The invention is described hereinafter with reference to two embodiments which are shown in the accompanying drawings, in which.

Figure 1:
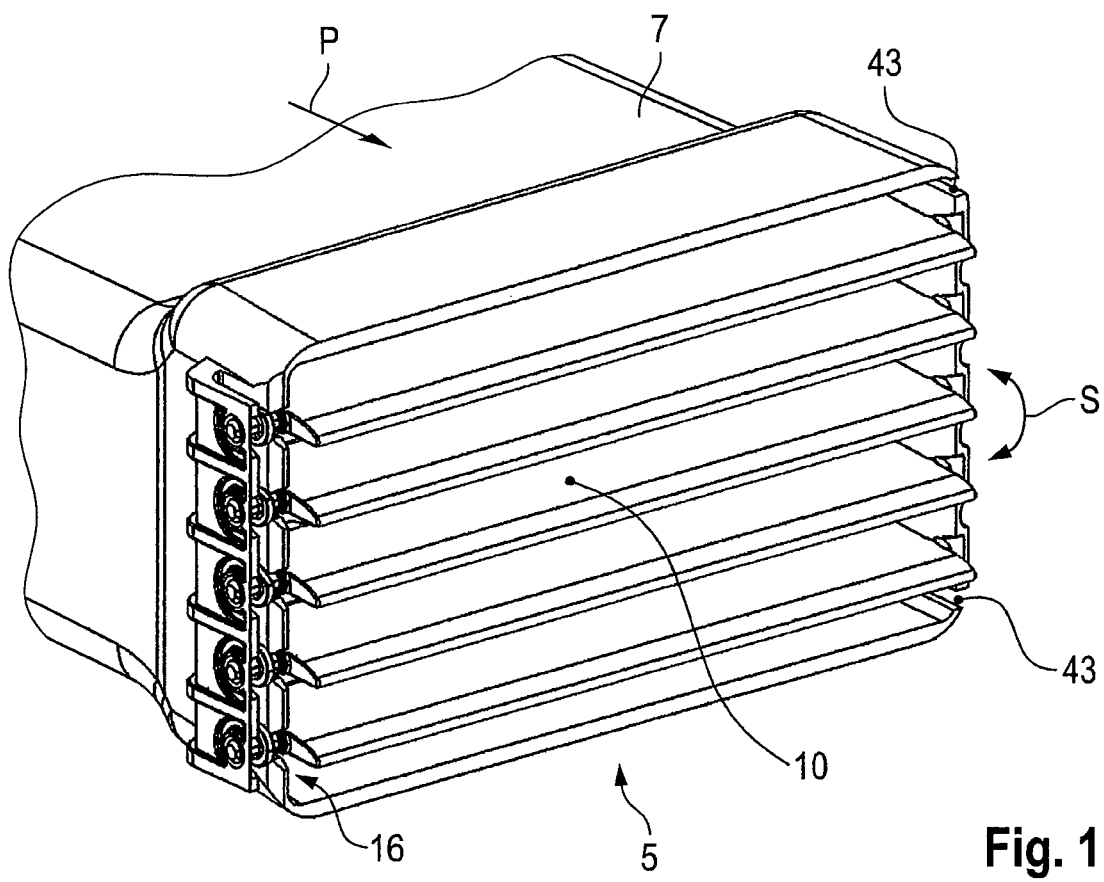
FIG. 1 shows an air vent according to the invention according to a first embodiment in a perspective view.

In FIG. 1 an air vent 5 according to a first embodiment may be seen, said air vent having a housing 7, shown in this case broken away, an air guiding channel being defined therein. Air which is introduced into an interior of a motor vehicle is able to flow through said channel in the direction of the arrow P.

The air vent 5 is provided with a plurality of lamellae 10 which are arranged substantially parallel to one another. Each of the lamellae 10 is pivotably mounted in the housing 7 such that it is able to be pivoted between different positions (see arrow S in FIG. 1).

In principle in a manner known per se, in addition to the lamellae 10, the air vent may contain further lamellae in order to be able to adjust the direction of the air flow emerging from the air vent 5. Moreover, the air vent 5 may also be provided with flaps, the free throughflow cross section being adjustable thereby. All this is not relevant further here and therefore also not described further.

Figure 3:
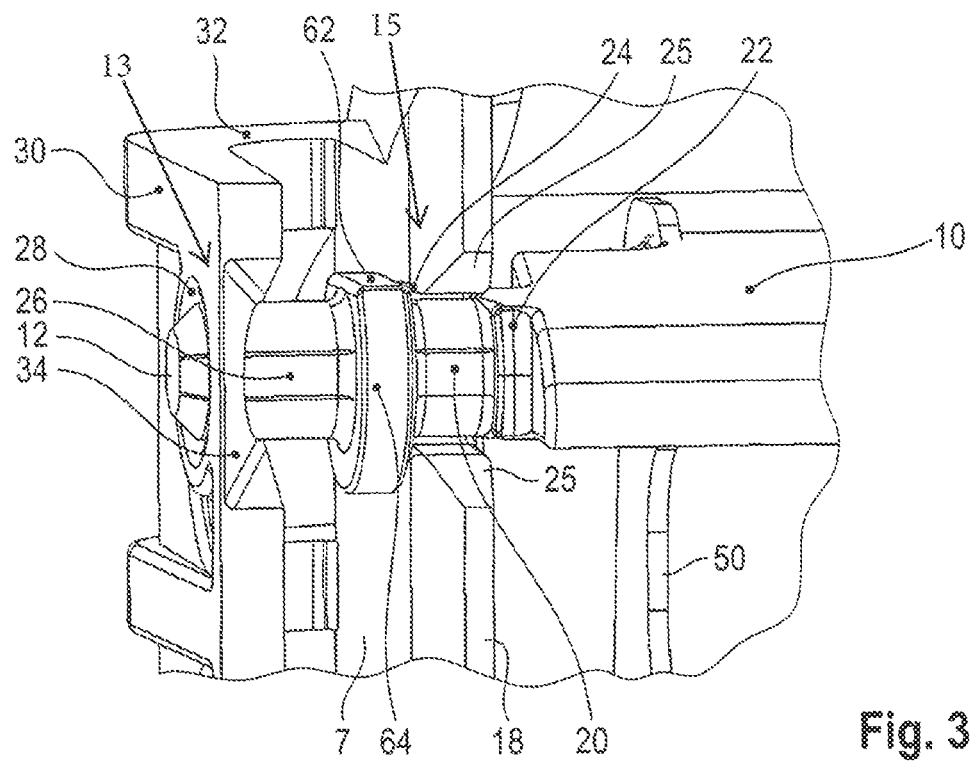
FIG. 3 shows in an enlarged perspective view a lamella mounted in the housing on the side on which the axial bearing is arranged.
Figure 4:
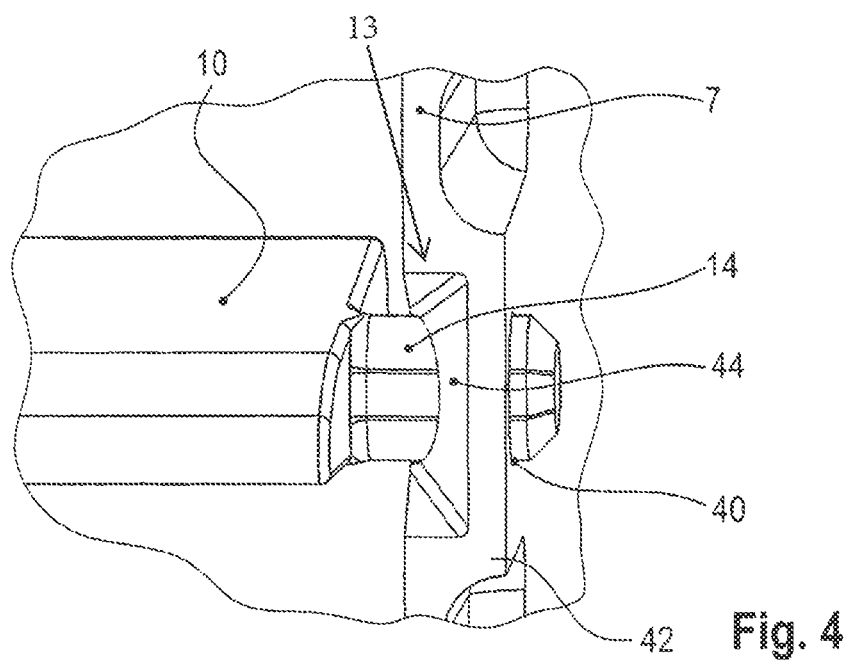
FIG. 4 shows in an enlarged perspective view the opposing side of a lamella mounted in the housing.

The lamellae 10 are elongated and have at opposing ends one respective bearing pin 12, 14 (see also FIGS. 3 and 4). The bearing pins 12, 14 define together the pivot axis, the corresponding lamella 10 in the housing 7 being pivotably mounted about said pivot axis.

The lamellae 10 are mounted in the housing 7 by a combination of fixed bearings and floating bearings. In this case, a radial bearing 13 and an axial bearing 15 are used on the side of the bearing pin 12 for each lamella 10 and on the side of the bearing pin 14 only one radial bearing 13 is used and no axial bearing.

In the exemplary embodiment shown, all of the axial bearings are arranged on the same side of the air vent. This is, however, technically not necessary; the axial bearings may also be arranged on different sides of the air vent. It is only technically important that just one axial bearing is provided per lamella.

Figure 2:
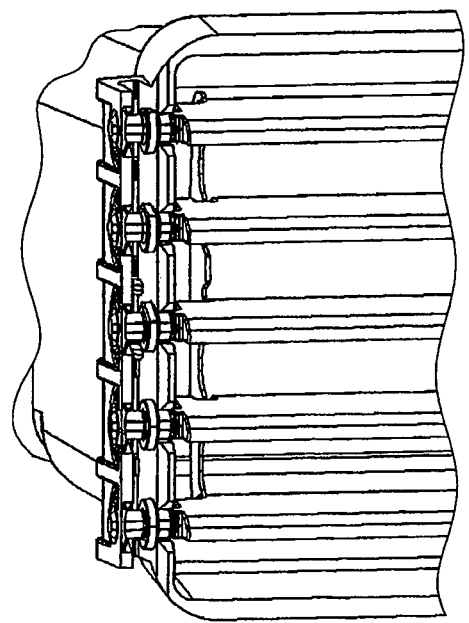
FIG. 2 shows in a broken-off perspective view the side of the lamellae on which the axial bearing is arranged.

The axial bearing has a fork 16 which is formed by a recess in an axial bearing strip 18 (see in particular FIGS. 2 and 3). Inside the fork 16 is located an axial bearing portion 20 of the bearing pin 12 which is defined on both sides by axial bearing surfaces 22, 24. These surfaces are located opposite one another in the axial direction at a distance which has a minimum width which is wider than the width of the fork 16.

The fork formed in the axial bearing strip 18 is provided on its side facing outwardly with two insertion chamfers 25 (see FIG. 3).

The recess defining the fork 16 in the axial bearing strip 18 is slightly wider than the diameter of the axial bearing portion 20 of the bearing pin 12, so that in the normal state no contact is made between the circumferential surface of the axial bearing portion 20 and the fork 16 of the axial bearing.

The radial bearing is formed on the side of the bearing pin 12 by a radial bearing portion 26 which has a cylindrical external contour. The radial bearing portion 26 engages in a radial bearing opening 28 which also has a circular cross section. The diameter of the radial bearing portion 26 and the radial bearing opening 28 are adapted to one another such that a bearing without clearance is provided.

The radial bearing opening 28 is formed in a radial bearing strip 30 which is attached to the housing 7 of the air vent 5 protruding to the side. To this end, a connecting portion 32 is provided, the radial bearing strip 30 being connected thereby to the housing 7.

As may be seen in FIG. 3, in particular, the radial bearing opening 28 is assigned a clipping chamfer 34 which is arranged on the same side as the insertion chamfer 25 of the axial bearing.

On the side of the bearing pin 14 a radial bearing is also provided by a radial bearing opening (in this case denoted by the reference numeral 40). The radial bearing openings 40 in this case are directly formed in a lateral housing wall 42 of the housing 7.

In this case, slots 43 (see FIG. 1) are provided on the upper edge and on the lower edge of the housing wall 42, said slots permitting the housing wall 42 to be able to be resiliently deflected in the region of the radial bearing openings 40 slightly outwardly, i.e. away from the lamellae 10.

In the same manner as on the side of the bearing pin 12, the radial bearing opening 40 is also assigned a clipping chamfer (in this case denoted by the reference numeral 44).

Figure 5:
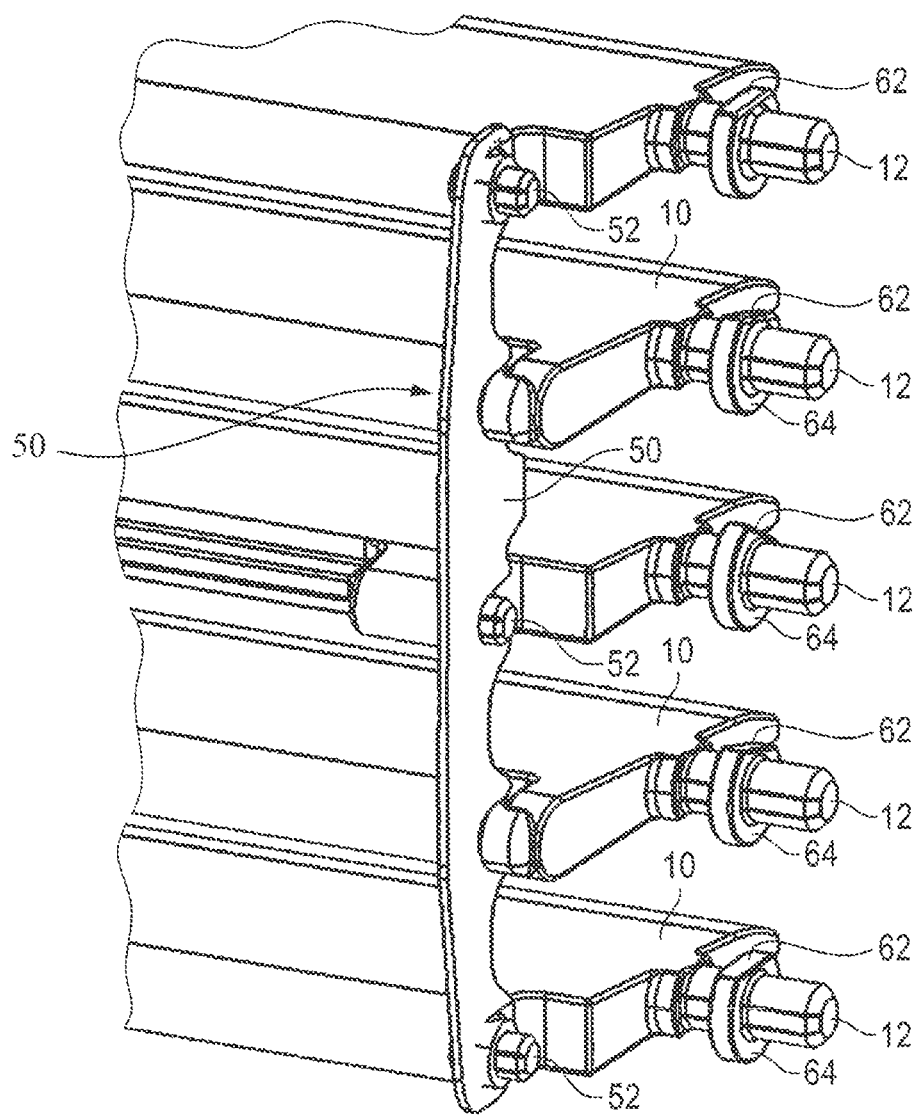
FIG. 5 shows in a broken-off perspective view the rear face of the lamellae with a coupling rod attached thereto.

The lamellae 10 are connected together by means of a coupling rod 50 (see in particular FIGS. 3 and 5). The coupling rod 50 consists of metal, so that its resilient pretensioning is maintained over a long service life and irrespective of the respectively prevailing temperatures and the prevailing humidity.

The coupling rod 50 is connected to each of the lamellae 10 by means of a coupling pin 52. The coupling pins 52 are oriented in opposing directions so that the lamellae may be braced relative to one another in the axial direction by means of the coupling rod 50.

To this end, in the initial state the coupling rod is planar. The coupling pins of the different lamellae are arranged slightly offset to one another in the axial direction. When the coupling rod 50 is mounted on the coupling pins 52 and the lamellae 10 are oriented relative to one another in the axial direction, the coupling rod 50 is deformed resiliently relative to the initial shape so that an axial pretensioning of the lamellae 10 relative to their axial bearings is achieved.

Figure 6:
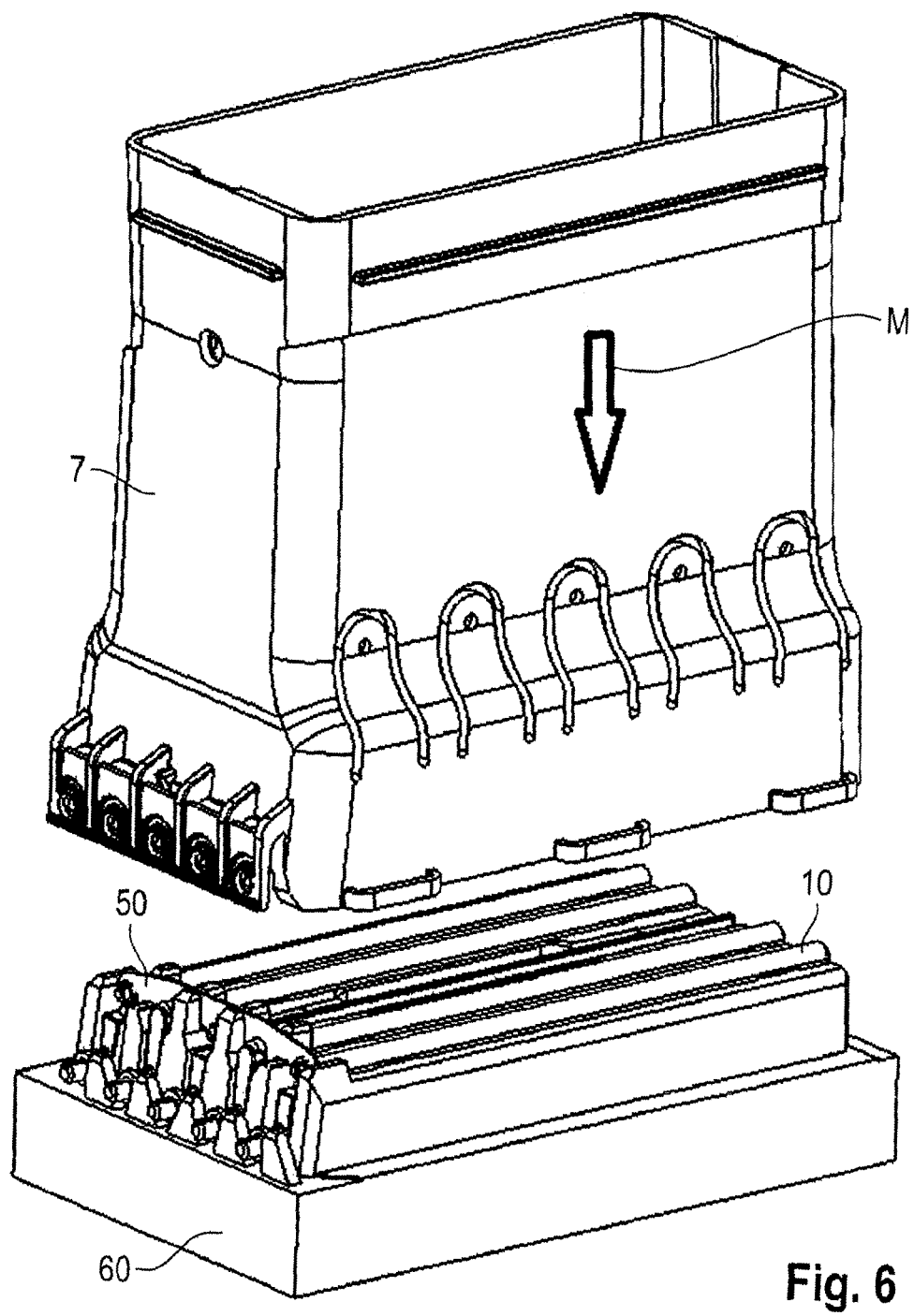
FIG. 6 shows schematically the mounting of the lamellae in the housing of the air vent.
Figure 7:
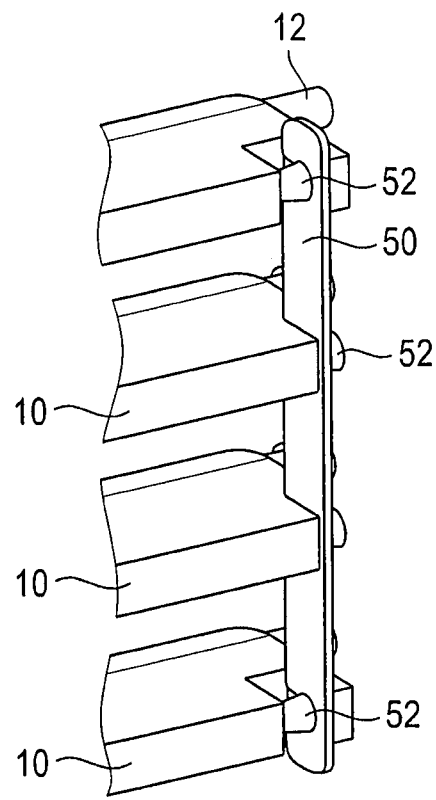
FIG. 7 shows in a viewing direction opposing the viewing direction of FIG. 5 the rear face of the lamellae according to a second embodiment with the coupling rod attached thereto.
Figure 8:
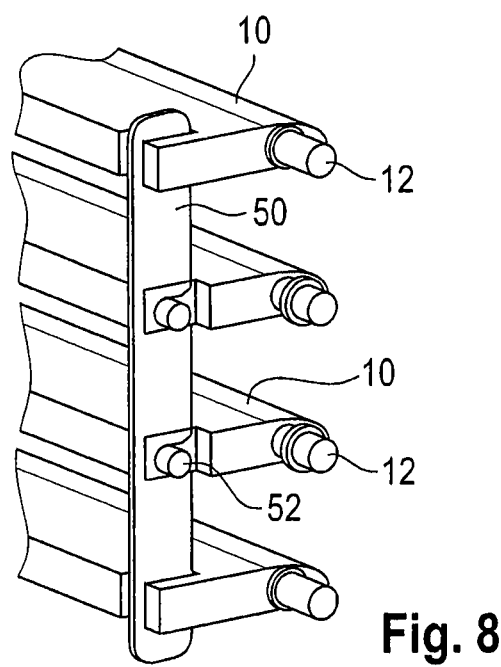
FIG. 8 shows the lamellae of the second embodiment in a view corresponding to FIG. 5.
Figure 9:
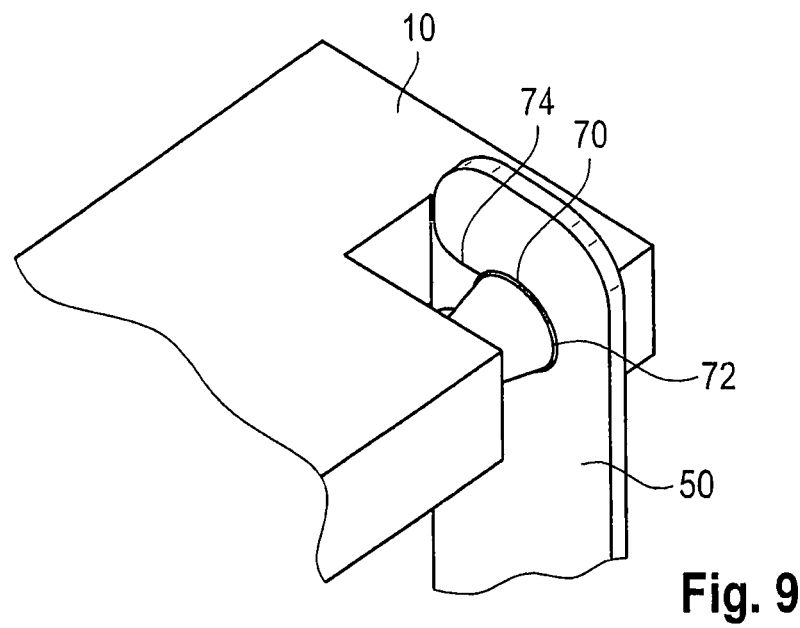
FIG. 9 shows a detail of the second embodiment in a first perspective view.
Figure 10:
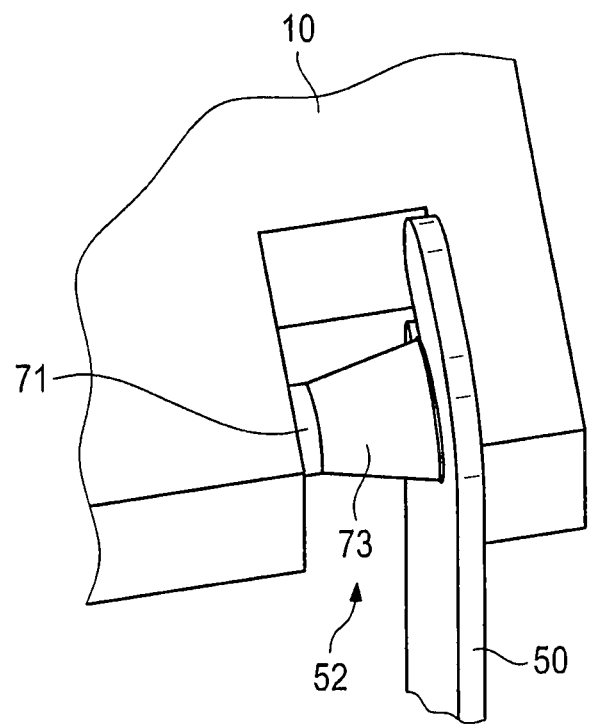
FIG. 10 shows the detail of FIG. 9 in a second perspective view.

In order to mount the lamellae 10 in the housing 7 of the air vent, said lamellae may be arranged in a mounting device 60 (see in particular FIG. 6). In this case, a positioning surface 62 may be kept correctly oriented, said positioning surface being provided on a shoulder portion 64 which protrudes radially between the axial bearing portion 20 and the radial bearing portion 26 of the bearing pin 12.

As may be seen in FIG. 5, the positioning surfaces 62 are oriented differently. This ensures that only the "correct" lamellae, with respect to the axial pretensioning, are able to be mounted. Thus the uppermost and the lowermost lamellae 10 are "coded" in the same manner and this coding differs from the coding of the second lamella above and below; in this case with respect to the axial pretensioning other lamellae have to be inserted. The central lamella 10 in turn is coded differently from the two upper and the two lower lamellae, since in this case a coupling pin 52 is used with a different axial position compared to the other lamellae.

The coding is also advantageous when the lamellae of an air vent have different lengths. In this case, in addition to the correct positioning for the pretensioning of the coupling rod, the correct position in the vent is also ensured by means of the coding.

The housing, as shown in FIG. 6, on the one hand, may be positioned in a mounting direction M in a linear manner on the lamellae 10, so that the radial bearing strip 30 and the housing wall 42 flex in the axial direction due to the presence of the clipping chamfers 34, 44 and, when the bearing pins 12, 14 engage in the radial bearing openings 28, 40, snap back again in a resilient manner; in this case the axial bearing portion 20 of the bearing pin 12 is automatically introduced by the insertion chamfers 25 into the fork of the axial bearing strip 18. The axial resilience of the radial bearings in this case is facilitated by the protruding attachment of the radial bearing strip 30 on the housing 7 and the slots 43 on the side of the housing wall 42.

Alternatively, it may be provided that the housing 7, which is initially slightly tilted with its radial bearing openings 40, is fed onto the bearing pins 14 and subsequently on its opposing side pushed down onto the bearing pins 12 so that said bearing pins snap into the radial bearing openings 28. In this case, it may be possible to dispense with the slots 43 in the housing 7.

The disclosed air vent and the mounting of the lamellae 10 in the housing 7 of the air vent result in a whole series of advantages.

Initially, the radial bearing openings 28, 40 may be produced with very low tolerances and a high degree of roundness, since only pins have to be deformed. Even if one of the bearing pins 12, 14 were to be slightly unround, this would not result in the actuating force of the lamellae changing over the pivoting range.

Due to the axial bearing being provided on only one side, the longitudinal tolerances of the lamellae 10, the dimensional tolerances of the housing 7 (due to shape alterations in the injection-molding process or during the mounting in the dashboard) or thermal expansions do not result in the lamellae 10 being braced in the axial direction inside the housing; as may be seen clearly in FIG. 4, the bearing pin 14 engages with axial clearance in the radial bearing opening 40 so that it is possible to compensate easily for any longitudinal differences without this affecting the actuating forces.

Since the friction ratios in the radial bearings and in the axial bearing may be very precisely set at relatively low expense, no costly friction pairings or lubricants are required.

As may be seen in FIG. 3, in particular, the coupling rod 50 viewed in the axial direction is arranged in the vicinity of the axial bearing. As a result, any tolerances have relatively little effect on the friction in the axial bearing which is produced by the bracing of the lamellae 10 relative to one another by means of the coupling rod.

The fork of the axial bearing protects the bearing pin 12 in the region of the radial bearing from excessively high loads as might occur when the lamellae 10 are loaded centrally with high radial forces, for example when an operator pushes with a high degree of force onto a lamella. In this case, the lamella 10 is deflected and the axial bearing portion 20 is supported on the side of the fork 16 of the axial bearing strip 18 opposing the axial bearing portion. As a result, it is possible for the radial bearing portion 26 of the bearing pin 12 to be able to be designed with a relatively small cross section.

On the side of the bearing pin 14, the housing wall 42 is designed to be sufficiently thin that the housing wall 42 in the region of the radial bearing opening 40 is able to twist slightly, such that the central axis of the radial bearing opening 40 follows the path of the bearing pin 14 when the lamella 10 is significantly deformed. This also prevents excessively high loads from acting on the bearing pin 14.

In FIGS. 7 to 10, the coupling between the coupling rod 50 and the lamellae 10 of an air vent according to a second embodiment is shown in detail. For the components known from the first embodiment, the same reference numerals are used and in this regard reference is made to the above descriptions.

In the second embodiment, the coupling rod 50 has an omega-shaped opening 70 for each coupling pin 52. Accordingly, the coupling pin 52 has a portion 71 with a smaller diameter corresponding to the opening of the omega on the coupling rod 50 and a portion 72 with a larger diameter corresponding to the bore size of the omega. A cone 73 is provided between the two portions 71, 72.

In principle, deviating from the embodiment shown, it is also possible that the omega-shaped opening 70 is used for the coupling with only two of the lamellae, and a U-shaped opening is used for the coupling with the remaining lamellae.

During mounting, the lamellae are inserted in the mounting device 60 and the coupling rod 50 is pushed in a direction over the portion 71 with the smaller diameter. The coupling rod 50 in this case slides with its omega openings 74 onto the portion 71 with the smaller diameter. By the bracing of the coupling rod 50 with the lamellae 10, the coupling rod 50 slides over the cone 73 onto the portion 72 with the larger diameter. As a result, the coupling rod 50 is guided without rattling and in a captive manner.

The invention claimed is:

1. An air vent for a motor vehicle, comprising
a housing which defines an air guiding channel,
a plurality of lamellae, each lamella having opposite first and second ends with bearing pins that pivotably attach the lamella to the housing for pivot about a pivot axis, wherein each lamella is mounted at its first end with the bearing pin of its first end positioned in both a radial bearing opening, for limiting movement of the bearing pin of its first end radially relative to the pivot axis, and an axial bearing fork, for limiting movement of the bearing pin of its first end axially along the pivot axis, wherein each lamella is mounted at its second end with the bearing pin of its second end positioned in a radial bearing opening but not positioned in any axial bearing fork, wherein the axial bearing forks are formed in an axial bearing strip; wherein each lamella is provided with a positioning surface that is oriented to interact with a mounting device so as to ensure correct placement of the lamella in the housing, and wherein the positioning surface of a first one of the lamellae is oriented differently than the positioning surface of a second one of the lamellae.

2. The air vent as claimed in claim 1, wherein for each radial bearing opening and axial bearing fork at each of the first ends, the axial bearing fork is designed separately from the radial bearing opening and is spaced axially apart from the radial bearing opening.

3. The air vent as claimed in claim 1, wherein each axial bearing fork encompasses the bearing pin assigned thereto with radial clearance.

4. The air vent as claimed in claim 3, wherein each axial bearing fork comprises an insertion chamfer.

5. The air vent as claimed in claim 1, wherein the axial bearing strip is integrally formed with the housing.

6. The air vent as claimed in claim 1, wherein each radial bearing opening is designed as a circular opening.

7. The air vent as claimed in claim 1, wherein the radial bearing openings of the first ends are attached to the housing so as to be able to be resiliently deflected in an axial direction.

8. The air vent as claimed in claim 1, wherein the radial bearing openings of the first ends are formed in a radial bearing strip.

9. The air vent as claimed in claim 1, wherein the radial bearing openings of the second end are integrally formed in a wall of the housing.

10. The air vent as claimed in claim 8, wherein the radial bearing openings of the radial bearing strip are designed to protrude from a side of the housing.

11. The air vent as claimed in claim 9, wherein slots are provided in the wall of the housing above and below a region of the radial bearing openings of the second ends.

12. The air vent as claimed in claim 1, wherein a clipping chamfer is assigned to each radial bearing opening.

13. The air vent as claimed in claim 1, wherein each lamella is provided with a positioning surface.

14. The air vent as claimed in claim 1, wherein the lamellae are connected together by means of a coupling rod which braces the lamellae relative to one another in an axial direction.

15. The air vent as claimed in claim 14, wherein the coupling rod is provided with at least two omega-shaped openings, each omega-shaped opening engaging a coupling pin of a corresponding one of the lamellae.

16. The air vent as claimed in claim 15, wherein the coupling pin comprises a portion with a smaller diameter, a portion with a larger diameter and a conical portion located therebetween.

17. An air vent for a motor vehicle, comprising:
a housing defining an air guiding channel,
a plurality of lamellae, each lamella having opposite first and second ends with bearing pins that pivotably attach the lamella to the housing, wherein each lamella is mounted with the bearing pin of its first end positioned in both a radial bearing opening located along a pivot axis of the bearing pin, for limiting movement of the bearing pin of its first end radially relative to the pivot axis, and an axial bearing fork located along the pivot axis, for limiting movement of the bearing pin of its first end axially along the pivot axis, wherein each lamella is mounted with the bearing pin of its second end positioned in a radial bearing opening but not positioned within any axial bearing fork, wherein the radial bearing openings of the second ends are integrally formed with the housing; wherein each lamella is provided with a positioning surface that is oriented to interact with a mounting device so as to ensure correct placement of the lamella in the housing, and wherein the positioning surface of a first one of the lamellae is oriented differently than the positioning surface of a second one of the lamellae.

18. The air vent as claimed in claim 17, wherein, for each lamella, the axial bearing fork of the first end is spaced axially away from the radial bearing opening along the pivot axis, and the axial bearing fork encompasses the bearing pin of the first end with radial clearance.

19. An air vent for a motor vehicle, comprising:
a housing which defines an air guiding channel, and
a plurality of lamellae, each lamella having opposed first and second ends, each first end having a bearing pin and each second end having a bearing pin, each lamella being pivotably attached by its bearing pins to the housing for pivot about a pivot axis, wherein each lamella is mounted with the bearing pin of its first end positioned in both a radial bearing opening that surrounds the bearing pin of its first end, for limiting movement of the bearing pin of its first end radially relative to the pivot axis, and in an axial bearing fork, for limiting movement of the bearing pin of its first end axially along the pivot axis, wherein the axial bearing fork includes an insertion chamfer, wherein each lamella is mounted with the bearing pin of its second end positioned only in a radial bearing opening that surrounds the bearing pin of its second end, wherein each axial bearing fork encompasses the bearing pin assigned thereto with radial clearance, wherein, for each lamella, the bearing pin of its first end is provided with at least one axial bearing surface which is arranged axially alongside of the axial bearing fork assigned thereto; wherein each lamella is provided with a positioning surface that is oriented to interact with a mounting device so as to ensure correct placement of the lamella in the housing, and wherein the positioning surface of a first one of the lamellae is oriented differently than the positioning surface of a second one of the lamellae.

* * * * *